(12) United States Patent
Starkey

(10) Patent No.: US 8,354,174 B2
(45) Date of Patent: Jan. 15, 2013

(54) ENVIRONMENTALLY FRIENDLY DEGRADABLE PAPER PRODUCTS

(75) Inventor: John F. Starkey, Waterford, WI (US)

(73) Assignee: Pres On Tape and Gasket Corporation, Addison, IL (US)

( * ) Notice: Subject to any disclaimer, the term of this patent is extended or adjusted under 35 U.S.C. 154(b) by 0 days.

(21) Appl. No.: 12/493,850

(22) Filed: Jun. 29, 2009

(65) Prior Publication Data

US 2009/0324981 A1   Dec. 31, 2009

Related U.S. Application Data

(60) Provisional application No. 61/076,386, filed on Jun. 27, 2008.

(51) Int. Cl.
   *B32B 23/04* (2006.01)

(52) U.S. Cl. .................................... 428/536; 428/537.5
(58) Field of Classification Search ................. 428/536, 428/537.5
   See application file for complete search history.

(56) References Cited

U.S. PATENT DOCUMENTS

| | | | | |
|---|---|---|---|---|
| 7,438,224 B1 * | 10/2008 | Jensen et al. | ................... | 235/380 |
| 7,621,472 B2 * | 11/2009 | Manu | ................ | 241/3 |
| 7,625,195 B2 * | 12/2009 | Manu | ............ | 425/110 |
| 7,641,112 B2 * | 1/2010 | Jensen et al. | .................. | 235/380 |

* cited by examiner

*Primary Examiner* — Leszek Kiliman
(74) *Attorney, Agent, or Firm* — Pauley Petersen & Erickson

(57) ABSTRACT

A card, such as a gift card, a security card, a ticket, and/or a pass, includes a machine readable component. The card is formed of a paper or paper/film laminate material that is compostable, thereby forming a degradable product.

11 Claims, 1 Drawing Sheet

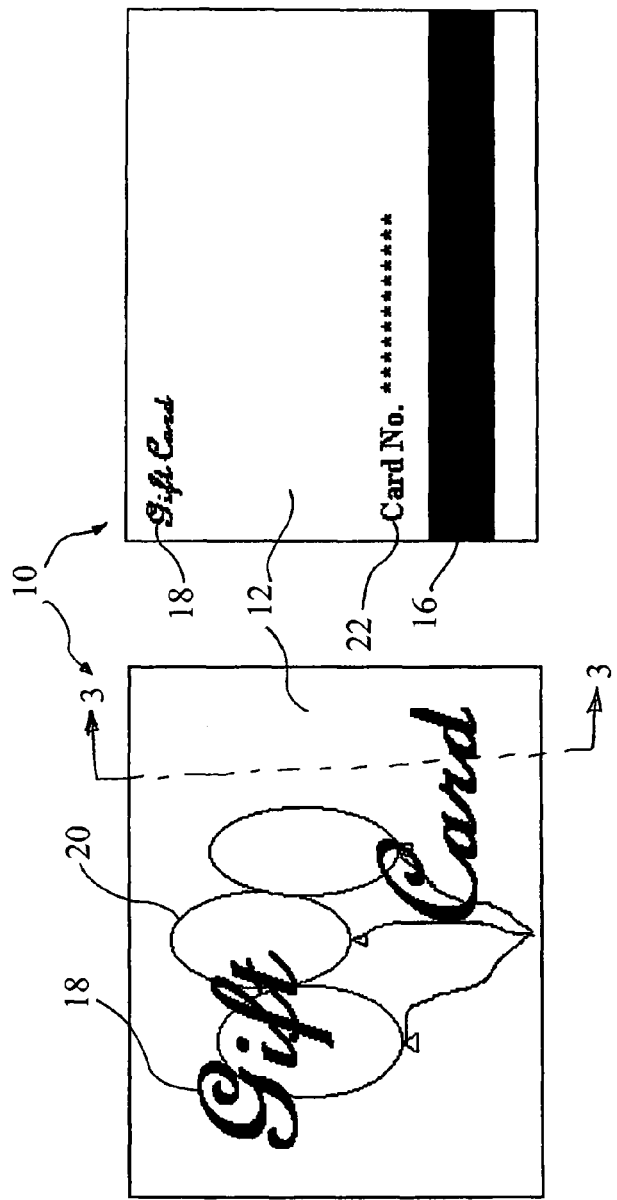
Fig. 1
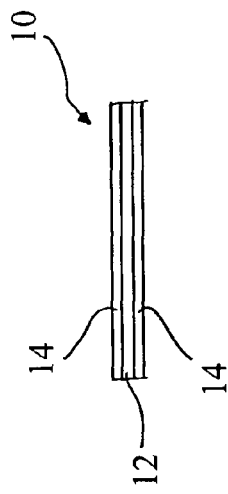
Fig. 2
Fig. 3

ENVIRONMENTALLY FRIENDLY DEGRADABLE PAPER PRODUCTS

CROSS REFERENCE TO RELATED APPLICATION

This Application claims the benefit of U.S. Provisional Patent Application Ser. No. 61/076,386, filed 27 Jun. 2008, which is incorporated herein by reference.

BACKGROUND OF THE INVENTION

1. Field of the Invention

This invention relates generally to paper products having a compostable laminate and, more particularly, to the use of paper products as a substitute for plastic in products such as gift cards.

2. Description of Related Art

Prior art gift cards, and other similar products which include information in a machine readable component, are currently manufactured using plastic and other similar materials which are incapable of breaking down under an industry standard, such as International Compostable Standard, and thus are not environmentally friendly.

SUMMARY OF THE INVENTION

The card of this invention may be used, for example, as a gift card, a security card, a ticket, and/or a pass. The card is preferably formed of a paper and/or a film laminate material that are both compostable, thereby forming a degradable product. Materials used in forming the products of this invention are environmentally friendly unlike non-compostable plastics that are commonly used in, for example, retail gift cards.

The card of this invention includes a machine readable component, such as a readable magnetic strip or a bar code, on at least one side. Suitable magnetic strips or bar codes can be both writeable and readable by currently available equipment.

The card is desirably coated on at least one side with the film laminate material. The film laminate material preferably comprises a bio-based film, a bio-polymer material, a cellulose film and/or an organic-based film.

Thus, the invention provides an environmentally friendly, compostable paper card for use as a gift card or other identification card. The coated or laminated paper is fully compostable and biodegradable, and can be used in various products.

BRIEF DESCRIPTION OF THE DRAWINGS

These and other objects and features of this invention will be better understood from the following detailed description taken in conjunction with the drawings, wherein:

FIG. 1 is a front view of a degradable paper card according to one embodiment of this invention;

FIG. 2 is a rear view of the degradable paper card of FIG. 1; and

FIG. 3 is a cross-section view of the degradable paper card of FIG. 1 along section 3-3.

DESCRIPTION OF THE INVENTION

According to a preferred embodiment of this invention, a card 10 includes a base layer 12, a film laminate material 14, and a machine readable component 16. The card 10 is preferably formed of a paper or a paper/film laminate material that is compostable, thereby forming a degradable product.

Compostable materials are a specific form of a biodegradable material. To be classified as compostable, the cards and other products of this invention must break down to a certain extent within a certain time period under particular conditions (e.g., 50-60% in 180 days). In a preferred embodiment of this invention, the card 10 meets an International Compostable Standard and/or an American Society of Testing and Materials (ASTM) Compostable Standard. The environmentally friendly products of this invention desirably meet the requirements of appropriate ASTM test methods, such as, without limitation, ASTM D6094-97, ASTM D6002-96e1, ASTM D6868-03, ASTM D7081-05, and/or ASTM D6954-04.

In one embodiment of this invention, the base layer 12 is formed of a compostable paper. The compostable paper desirably includes a post consumable waste material in some percentage, ranging from 0% to 100%, of the compostable paper. In one embodiment of this invention, the compostable paper desirably contains from 50% to 100% post consumable waste material. In another embodiment, the compostable paper contains up to about 50%, and preferably at least between about 10% and about 30% post consumable waste material. In one embodiment, the card comprises about 20% post consumable waste, with a remainder being virgin paper material. The compostable paper structure can vary depending on need.

The base layer 12 is desirably highly machined, and is printable on at least one, and desirably both sides, such as with a text 18, a graphic 20, and/or the machine readable component 16. The card is optionally printed with an identifying card number 22. Various and alternative printing processes, such as are known in the printing industry, are available for printing on the cards and other products of this invention.

The card 10 of this invention includes the machine readable component 16, such as a readable magnetic strip and/or a bar code, on at least one side. The machine readable component 16 can be printed or otherwise applied to the base layer 12 and/or the film laminate material 14. The machine readable component 16 is desirably applied "blank", to be programmed at a later date, such as upon purchase of a gift card by an end consumer. Suitable magnetic strips or bar codes can be both writeable and readable by currently available equipment.

The base layer 12 is further desirably coated on at least one side with the film laminate material 14. The film laminate material 14 preferably comprises a compostable and/or a biodegradable coating. The film laminate material 14 can comprise a variety of materials including, for example, films, coatings, or laminates made from compostable or biodegradable polymers, polylactic acid (PLA), and/or cellulose films and materials (e.g., cellophane).

The card 10 of this invention is suitable for use in the same environment as current plastic readable cards (e.g., −20° F. to 200° F.).

As mentioned above, the paper and coated paper of this invention are not intended to be limited to gift cards, and can be used for other types of cards, such as tickets and passes. Additionally, the compostable paper and coated paper of this invention are useful in other products, such as header cards, tags, labels, greeting cards (with or without an incorporated gift card), announcements, invitations, retail displays, retail packaging, consumable packaging and packaging material.

Thus, the invention provides an environmentally friendly, compostable paper card for use as a gift card or other identification card. The coated or laminated paper is fully compostable and biodegradable, and can be used in various products.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A card comprising:
a base layer formed of a paper;
a machine readable component comprising a readable magnetic strip applied to the base layer, wherein the base layer and the machine readable component are compostable, wherein the base layer and the machine readable component break down at least 50% in 180 days; and
a film laminate material applied to the base layer, wherein the film laminate material comprises at least one of a bio-based film, a bio-polymer material, a cellulose film or an organic-based film that is compostable to break down at least 50% in 180 days.

2. The card of claim 1, wherein the paper comprises a post consumable waste material.

3. The card of claim 2, wherein the paper further comprises a virgin paper material.

4. The card of claim 1, wherein the paper is machined and printable on.

5. The card of claim 1, wherein the machine readable component comprises a bar code printed on the paper.

6. The card of claim 1, wherein the machine readable component is programmable.

7. The card of claim 1, wherein the card is able to meet the requirements of an appropriate ASTM test method.

8. A card comprising:
a base layer formed of a paper;
a film laminate material applied to the base layer, wherein the film laminate material comprises at least one of a bio-based film, a bio-polymer material, a cellulose film or an organic-based film;
a machine readable component comprising a readable magnetic strip applied to the film laminate material, wherein the base layer, the film laminate material, and the machine readable component are compostable to break down at least 50% in 180 days; and
wherein the base layer, the film laminate material, and the machine readable component meet an American Society of Testing Materials Compostable Standard.

9. The card of claim 8, wherein the paper comprises a post consumable waste material.

10. The card of claim 9, wherein the paper further comprises a virgin paper material.

11. The card of claim 8, wherein the machine readable component is programmable.

* * * * *